Figure 1:
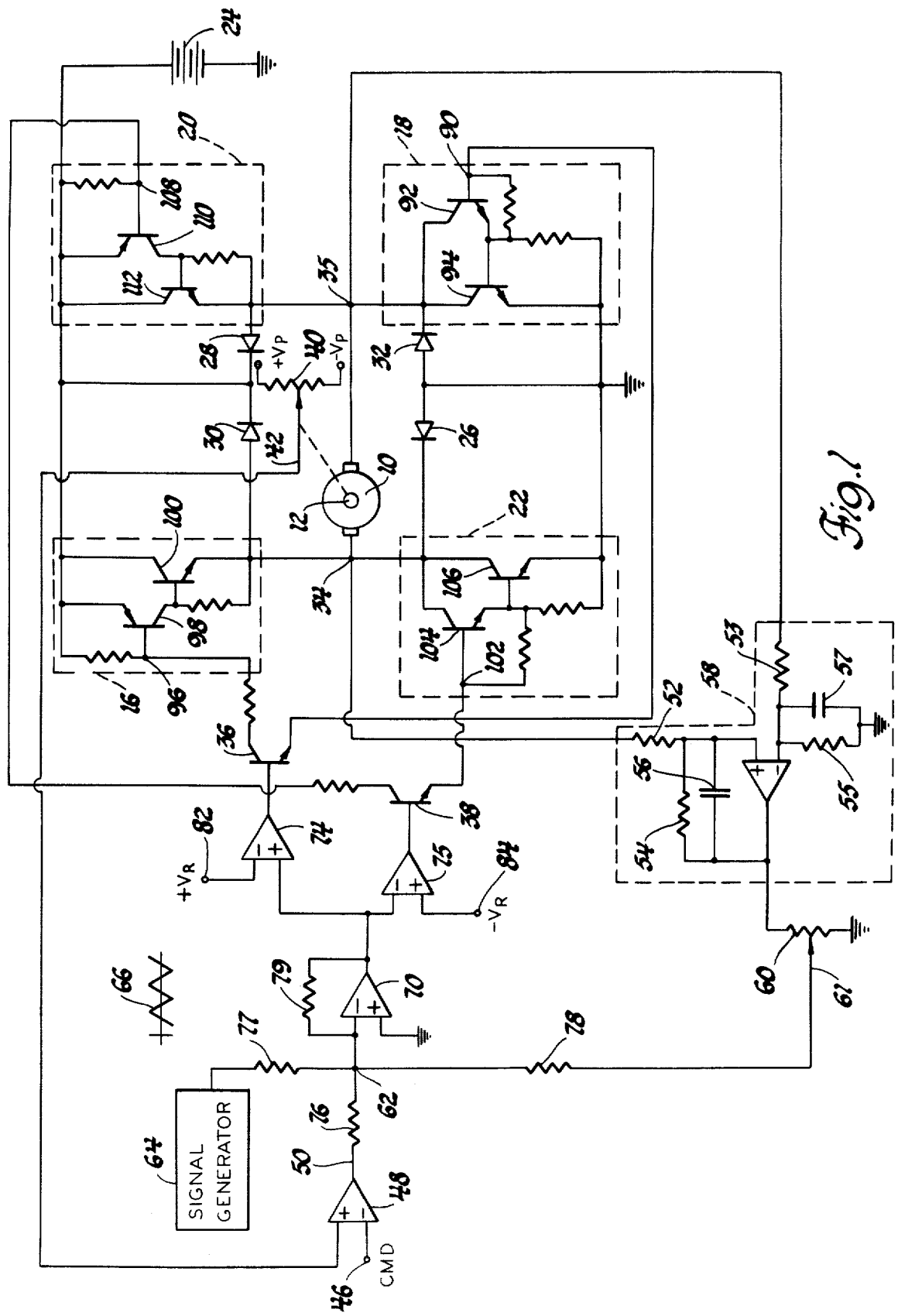

United States Patent [19]

Van Landingham

[11] 4,300,081
[45] Nov. 10, 1981

[54] MOTOR VOLTAGE FEEDBACK FOR A SERVO MOTOR CONTROL SYSTEM

[75] Inventor: Kenneth E. Van Landingham, Ortonville, Mich.

[73] Assignee: General Motors Corporation, Detroit, Mich.

[21] Appl. No.: 130,542

[22] Filed: Mar. 14, 1980

[51] Int. Cl.³ .................................. G05B 11/28
[52] U.S. Cl. ................... 318/599; 318/616; 318/331; 318/341; 324/177
[58] Field of Search ............ 318/599, 616, 617, 618, 318/331, 341; 324/177

[56] References Cited

U.S. PATENT DOCUMENTS

| | | | |
|---|---|---|---|
| 3,401,324 | 9/1968 | James | 318/341 |
| 3,436,635 | 4/1969 | James et al. | 318/599 |
| 3,536,972 | 10/1970 | Lutz et al. | 318/331 |
| 3,541,416 | 11/1970 | Woyton | 318/331 |
| 3,818,297 | 6/1974 | Ha et al. | 318/331 |
| 3,949,287 | 4/1976 | Wagensonner et al. | 318/331 |
| 4,006,391 | 2/1977 | Deering et al. | 318/341 |
| 4,064,443 | 12/1977 | Yamada et al. | 318/331 |

*Primary Examiner*—Stanley J. Witkowski
*Assistant Examiner*—Eugene S. Indyk
*Attorney, Agent, or Firm*—Mark A. Navarre

[57] ABSTRACT

In a pulse-width-modulated servo motor control system, a signal indicative of the average terminal voltage of the servo motor is fed back to stabilize the response of the control system. Under normal conditions the feedback signal is representative of the velocity of the servo motor output shaft and thereby operates to stabilize the control system response as a function of the output shaft velocity. Under adverse conditions tending to increase the power supplied to a motor, the feedback signal increases in a manner to limit the power supplied to the motor and to maintain the control system bandwidth substantially constant.

2 Claims, 2 Drawing Figures

MOTOR VOLTAGE FEEDBACK FOR A SERVO MOTOR CONTROL SYSTEM

This invention relates to motor voltage feedback stabilization for pulse-width-modulated DC servo motor control systems.

In general, a position servo control system operates in a follow-up mode to adjust the output shaft position of a servo motor in accordance with an input voltage. A transducer responsive to the position of the servo motor output shaft is fed back with the input signal to a summing junction to develop an error signal, and the servo motor is energized in a manner to reduce the magnitude of the error signal. In a pulse-width-modulated system the servo motor is energized for a duration corresponding to the width of a control pulse, and the width of a respective control pulse is determined as a function of the magnitude of the error signal. If system instability is encountered, a further feedback loop is usually provided to dampen the system response as a function of the velocity of the servo motor output shaft. In this way, undesired oscillation is prevented. The velocity feedback signal is typically obtained by connecting a tachometer to the servo motor output shaft. Aside from the extra expense of a tachometer, it has generally been recognized that the addition of a tachometer significantly decreases the overall reliability of the control system.

It has also been proposed to provide the velocity feedback signal by measuring the back or counter EMF of the servo motor when it is not energized. For pulse-width-modulated control systems, the back-EMF portion of the motor voltage occurs after a motor energization period and its corresponding inductive kickback/clamp period and prior to the commencement of the next energization period. Accordingly, the pertinent prior art control systems have provided sample-and-hold or similar circuitry in order to synchronize the detection of the motor voltage with the time period corresponding to the presence of the back-EMF voltage alone. However, such circuit arrangements also significantly decrease the reliability of the control system due to the large number of extra components required.

It is therefore an object of this invention to provide an improved feedback servo control system wherein a servo motor velocity feedback signal is obtained without resorting to the use of a tachometer or elaborate timing control circuitry.

It is a further object of this invention to provide an improved servo control system wherein the continuous average terminal voltage of the servo motor provides an accurate indication of the velocity of the servo motor output shaft for feedback purposes.

It is a further object of this invention to provide an improved servo motor control system having motor velocity feedback stabilization, wherein the bandwidth of the control system is maintained substantially constant despite undesired operating conditions that tend to vary the bandwidth.

It is another object of this invention to provide an improved servo motor control system wherein the response of the system is stabilized as a function of the velocity of the motor output shaft during normal operating conditions, and wherein the power supplied to the motor is limited during extreme or unexpected operating conditions that tend to raise the motor power input above a desired value.

These objects are carried forward by providing various circuit restraints for (1) ensuring that the duration of the energization period and the inductive kickback/clamp period are substantially equal, and (2) that the motor voltage during the energization period is substantially equal and opposite to the motor voltage during the inductive kickback/clamp period. More specifically, the time constants of the motor energization and inductive discharge circuits are designed to be substantially equal and the motor energization pulse-width is limited to less than the L/R time constant of the motor. When the continuous motor voltage is averaged, the voltage associated with motor energization substantially cancels the voltage associated with the inductive kickback/clamp, leaving only the voltage corresponding to the back-EMF of the motor. As a result, the average motor voltage over an entire pulse repetition period (energization, kickback/clamp, and back-EMF) substantially corresponds to the velocity of the servo motor output shaft.

Further advantages of the control system of this invention relate to its ability to limit the power supplied to the motor under failure or extreme operating conditions and to maintain the control system bandwidth substantially constant.

IN THE DRAWINGS

FIG. 1 is a circuit diagram of the servo motor control system of this invention.

Figure 2:
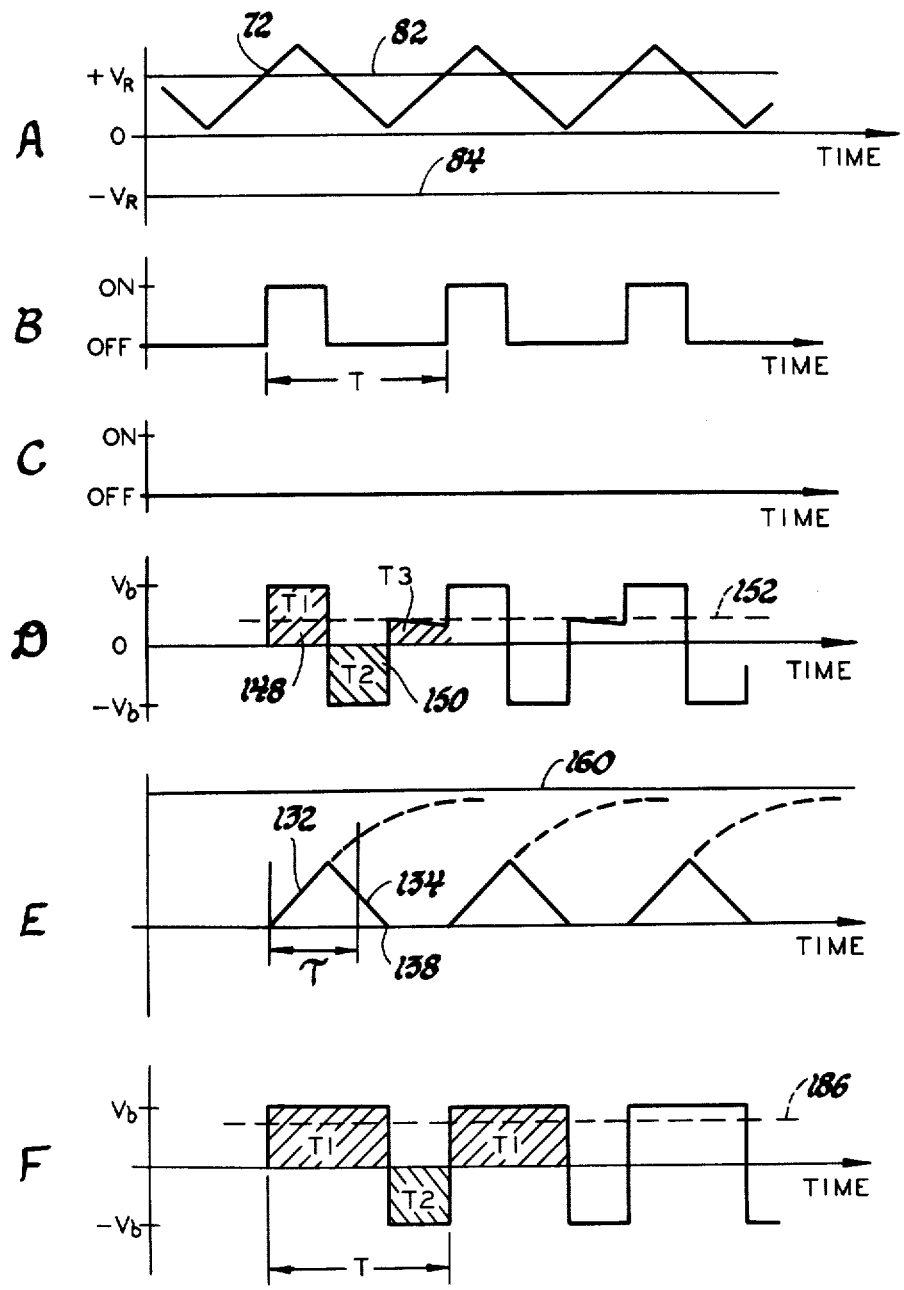

FIG. 2 graphically illustrates the operation of the control system. Graphs A–E illustrate operation under normal conditions, while graph F illustrates operation under failure or unexpectedly high power demand conditions.

Referring now to FIG. 1, reference numeral 10 designates a bi-directional DC servo motor having an output shaft 12 for operating a load device such as the steering mechanism of an automated vehicle. Although various types of DC motors may be used, motor 10 is preferably a permanent magnet or shunt-field type motor. Energization current is supplied to the windings of motor 10 through selectively actuable switches 16, 18, 20 and 22 from storage battery 24. Diodes 26, 28, 30 and 32 operate to clamp the reverse inductive voltage developed in the motor windings upon deenergization to a voltage level equal to that of battery 24 neglecting the diode voltage drops. To rotate motor output shaft 12 in a first direction, switches 16 and 18 are closed, completing a current path through the motor 10 in a direction from motor terminal 34 to motor terminal 35. When switches 16 and 18 are reopened, the inductive energy stored in the motor windings is directed in a manner to charge battery 24 through a circuit comprising battery 24, motor 10 and diodes 26 and 28. To rotate motor output shaft 12 in the opposite direction, switches 20 and 22 are closed to complete a circuit from battery 24 through motor 10 in a direction from terminal 35 to terminal 34. When switches 20 and 22 are reopened, the inductive energy stored in the motor windings is directed in a manner to charge battery 24 through diodes 30 and 32.

Switches 16 and 18 are controlled in accordance with the conduction state of transistor 36 and switches 20 and 22 are controlled in accordance with the conduction state of transistor 38. It should be obvious that at no time may both transistors 36 and 38 be in a conductive state. Switches 16, 18, 20 and 22 each operate in the same manner and are comprised of two transistors and two biasing resistors. Specifically, switches 16 and 20 are identical, as are switches 18 and 22. When transistor 36 becomes conductive, it raises the voltage potential at terminal 90 of switch 18 to bias transistors 92 and 94 to a conductive state, and lowers the voltage potential at terminal 96 of switch 16 to bias transistors 98 and 100 conductive. A motor energization circuit is thereby completed through battery 24, transistor 100, motor 10, and transistor 94. When transistor 36 is rendered nonconductive, transistors 92, 94, 98 and 100 also return to a nonconductive state. When transistor 38 becomes conductive, it raises the voltage potential at terminal 102 of switch 22 to bias transistors 104 and 106 conductive, and lowers the voltage potential at terminal 108 of switch 20 to bias transistors 110 and 112 conductive. A motor energization path is thereby completed through battery 24, transistor 112, the windings of motor 10, and transistor 106. When transistor 38 is returned to its nonconductive state, transistors 104, 106, 110 and 112 are also biased nonconductive.

Potentiometer 40 is connected between a positive and a negative reference voltage ($+Vp$, $-Vp$), and movable contactor 42 is mechanically connected to motor output shaft 12 as indicated so that the voltage appearing at movable contactor 42 is indicative of the instant rotational position of output shaft 12. This voltage (hereinafter referred to as the angle feedback signal) along with a command voltage (CMD) 46 is applied as an input to differential amplifier 48 to generate an error signal on conductor 50. The command voltage, which may be obtained in a number of ways, represents a desired motor output shaft position. For example, if the load controlled by motor 10 is the steering mechanism of an automated vehicle, the command voltage is developed by a lateral guidance mechanism and corresponds to the required steer angle for vehicle path correction. Terminals 34 and 35 of servo motor 10 are connected as input to averaging circuit 58, the output of which represents the average voltage appearing across servo motor 10 over one or more pulse repetition periods. Accordingly, resistors 52–55 and capacitors 56–57 are preferably chosen to result in a RC circuit time constant of several pulse repetition periods. It will also be appreciated that the desired overall bandwidth of the system represents an upper limit on the time constant of averaging circuit 58. The output of circuit 58 is connected to potentiometer 60, and potentiometer tap 61 picks off a signal of suitable level for connection to terminal 62. Signal generator 64 develops a zero DC voltage level triangular wave signal as indicated by waveform 66. This signal is applied to terminal 62, and terminal 62 is connected to summing junction operational amplifier 70 so that the output of amplifier 70 is a triangular wave having a DC voltage component indicative of the instantaneous motor energization required to reduce the error signal at conductor 50 to zero in a stable manner. Resistors 76–79 are of suitable magnitude to obtain the proper gain for amplifier 70. The output of amplifier 70 is applied as an input to both comparators 74 and 75 for the purpose of developing pulse-width-modulation energization pulses for transistors 36 and 38. Positive and negative reference voltages 82 and 84 are connected to the other inputs of comparators 74 and 75 respectively. The output of comparator 74 is connected to control the conduction of transistor 36, and the output of comparator 75 is connected to control conduction of transistor 38.

The waveforms shown in FIG. 2 serve to illustrate the operation of the circuit described reference to FIG. 1. Graph A depicts a triangular waveform 72 having a DC voltage component, such as a waveform appearing at the output of summing amplifier 70. Positive and negative reference voltages 82 and 84 are also illustrated. As noted before, the magnitude of the DC component relates to the desired energization for servo motor 10—a parameter determined in accordance with command voltage 46, the angle feedback signal, and the motor voltage feedback signal. Comparators 74 and 75 continually compare the voltage potential of waveform 72 with positive and negative reference voltages 82 and 84, and graphs B and C illustrate the resulting conductivity of transistors 36 and 38 respectively. Transistor 38 is biased conductive only when the voltage potential of waveform 72 is more negative than negative reference voltage 84. For this illustration, transistor 38 remains nonconductive since the above stated condition never occurs. Transistor 36 is biased conductive only when the voltage potential of waveform 72 is more positive than positive reference voltage 82. The duration of the on-periods corresponds to the magnitude of the DC component of waveform 72, and transistor 36 actuates switches 16 and 18 during the on-periods to connect battery 24 to motor 10. Accordingly, battery 24 supplies energization current to servo motor 10 in a direction from terminal 34 to terminal 35 in accordance with the pulses depicted in graph B. It will be appreciated that the pulse repetition period T (inverse frequency) remains constant, and equal to the period of waveform 72.

Graph D of FIG. 2 illustrates the motor voltage corresponding to the waveforms shown in graphs A–C. The voltage potential of battery 24 (Vb) appears across terminals 34 and 35 of servo motor 10 for the motor energization period, designated as T1. Graph E illustrates the motor armature current and it will be seen that during time period T1, the motor armature current rises as indicated by reference numeral 132. When transistor 36 is rendered nonconductive to interrupt the motor energization path, the inductive energy stored in servo motor 10 is used to charge battery 24 in the manner described in reference to FIG. 1. During this time period (T2) the voltage across servo motor terminals 34 and 35 is clamped by diodes 26 and 28 to substantially that of battery voltage (Vb). Since, however, the inductive energy has a reverse voltage polarity, the motor voltage during the time period T2 in graph D is shown as a negative voltage. During time period T2, the motor armature current decreases toward zero as shown in graph E and indicated by reference numeral 134. When the motor armature current goes to zero, as designated by reference numeral 138, the voltage potential appearing across servo motor terminals 34 and 35 (during time period T3) is due solely to back-EMF—a function of the velocity of motor output shaft 12.

This invention recognizes that the average voltage potential 152 across servo motor terminals 34 and 35 over an entire pulse repetition period (T) is representative of the velocity of servo motor output shaft 12 when the area of shaded portion 148 (T1) equals the area of shaded portion 150 (T2). When the above condition exists and the motor voltage is averaged (as by circuit 58), the resulting voltage 152 will reflect only the motor voltage occurring during time period T3—a voltage directly proportional to the velocity of motor output shaft 12. In order to ensure the equality of areas 148 and 150 so that the average voltage over time period T1 and T2 is equal to zero, the following circuit design constraints are adhered to. Firstly, the time constants of the motor energization circuits (comprising switches 16, 18, 20 and 22) are substantially equal to the time constants of the inductive energy discharge circuits (comprising diodes 26, 28, 30 and 32). This constraint may be accomplished through the proper selection of the above mentioned circuit elements. Secondly, the reverse inductive voltage occurring during time period T2 is clamped by diodes 26, 28, 30 and 32 to the same voltage potential (Vb) applied to servo motor 10 during the energization period T1. Thirdly, the duration of energization period T1 is limited to less than the L/R time constant ($\tau$) of motor 10 as indicated in graph E of FIG. 2. Due to the L/R time constant of servo motor 10, the energization current 132 rises exponentially as indicated in graph E. It will be appreciated by those skilled in the art that the increase in armature current is relatively linear during the motor time constant (during which the armature current reaches approximately 63% of its final value) and then asymptotically approaches a target value designated by reference numeral 160. As long as the motor energization period T1 is constrained to less than the motor time constant, the rise in armature current through motor 10 is nearly linear. The armature discharge current or inductive return current (designated by reference numeral 134 in graph E) is also an exponential function, and diodes 26, 28, 30, and 32 operate to clip the discharge current before it becomes significantly nonlinear. If in addition, the T1 motor voltage is substantially equal and opposite to the T2 motor voltage and the charge and discharge time constants are substantially equal, areas 148 and 150 will be substantially equal. This condition is illustrated in graphs A–E, and persists as long as the above constraints are adhered to. As noted before, the second constraint is achieved through the clamping action of diodes 26, 28, 30 and 32, and the third constraint is achieved through the proper selection of switches 16, 18, 20 and 22, and diodes 26, 28, 30 and 32 so that the charge and discharge circuits have substantially equal impedance. The first constraint (limiting energization period T1 to less than the motor time constant) is achieved through the negative feedback obtained from motor voltage terminals 34 and 35, and by matching the maximum desired motor input power (T1 equal to the L/R motor time constant) to the maximum expected motor load. In addition, the relationship between energization period T1 and pulse repetition period T must be such that time period T3 is present following the termination of inductive discharge period T2. If the pulse repetition period T is not at least twice as long as the energization period T1, the subsequent energization pulse will begin at or prior to the commencement of time period T3. Accordingly, the pulse repetition period T should be at least twice as long as the motor L/R time constant—the maximum energization period under normal conditions. Considering system efficiency, it has been found that optimum performance occurs when the pulse repetition period T is chosen to be 2.0–3.3 motor L/R time constants. As a matter of design, the L/R motor time constant may be modified by the insertion of lumped impedance elements. For example, the time constant may be lengthened by inserting an inductor in series with the motor winding.

Graph F of FIG. 2 illustrates the motor voltage for conditions under which energization period T1 exceeds the L/R time constant of servo motor 10. As indicated earlier, this condition may occur due to a number of factors, such as a failure in the control system circuitry, sudden motor starting, or extreme loading as when motor output shaft 12 is locked. Whatever the reason for the increase in time period T1, a typical control system would obediently respond to the long T1 pulsewidths and possibly overload the control system, as well as change the system bandwidth (response time). In a stalled or locked rotor condition, for example, the output of a tachometer would provide no useful negative feedback since the velocity of the motor output shaft 12 under this condition would be zero RPM. However, the feedback control system of this invention operates to limit the width of the energization pulses T1 under the above conditions since the motor output shaft velocity feedback signal is obtained as a function of the average motor voltage. Under the above mentioned conditions (T1 longer than L/R motor time constant) the energization time period T1 and the inductive discharge time period T2 may occupy the entire pulse repetition period (T) as shown in graph F. As a result, the motor voltage is at no time due solely to back-EMF, and the average motor voltage is not representative of the velocity of servo motor output shaft 12. Although the average motor voltage is not representative of the motor output shaft velocity under such conditions, it does assume a relatively high voltage level such as designated by reference numeral 186 and thereby operates in negative feedback to limit the width of energization pulses T1 to an acceptable amount, and to maintain the system bandwidth substantially constant.

The motor voltage feedback control system of this invention has particular utility when the power supply for the system is subject to voltage fluctuation. A control system is usually designed to operate satisfactorily at the lowest expected supply voltage in order to establish the minimum control system bandwidth (maximum response time). Overvoltage fluctuations tend to increase the power supplied to the motor and therefore increase the bandwidth of the control system. With the control system of this invention, however, the average motor voltage feedback is responsive to such overvoltages and operates to decrease the energization time period T1 to thereby maintain the control system bandwidth relatively constant. An example of a source that provides this type of supply voltage is an automotive storage battery wherein the terminal voltage commonly varies between eight and fifteen volts, depending upon loading and charging rate.

In conclusion, the average motor voltage signal of the servo motor control system of this invention provides a stabilizing negative feedback signal that corresponds to the velocity of servo motor output shaft 12 under normal operating conditions. The velocity feedback signal is thus very simple and reliable compared to prior art designs which include tachometers and synchronized sampling circuitry. Furthermore, the motor voltage feedback signal operates to limit the motor power input and to maintain the control system bandwidth substantially constant despite adverse operating conditions such as stalled or blocked rotor, control system failures, and fluctuating supply voltages.

Although this invention has been described in reference to specific embodiments, it is not meant to be limited thereto and various modifications may be made therefrom without departing from its spirit and scope.

The embodiments of the invention in which an exclusive property or privilege is claimed are defined as follows:

1. A feedback control system for controlling the output shaft of a servo motor, comprising:
    means for generating an error signal as a function of the difference between a desired shaft position and the actual shaft position;
    means connected to said motor for developing a feedback signal as a function of the average terminal voltage of said motor;
    means for combining said error signal with said feedback signal for decreasing the magnitude of said error signal and for forming control pulses therefrom to define energization periods for said motor;
    motor control means including an energization circuit path effective during said energization periods to connect said motor to a source of direct voltage, and a discharge circuit path effective during an inductive discharge period following an energization period to clamp the reverse inductive voltage of said motor at substantially that applied to said motor during said energization period, the relationship among (1) the energization and discharge circuit path time constants, (2) the duration of said energization period, (3) the repetition frequency of said control pulses, and (4) the L/R time constant of said motor being such that each of said discharge periods is substantially equal in duration to an associated energization period and that a counter EMF voltage is developed in said motor during a time period between the termination of said discharge period and the beginning of a subsequent energization period whereby the continuous average motor voltage corresponds substantially to the back-EMF of said motor and the response of said control system is stabilized in accordance with the velocity of said motor output shaft.

2. An electrical system for providing a signal that is a function of the counter EMF of an electric motor comprising, a motor having a winding, a source of voltage, switching means operative to define a motor energization period wherein said motor winding is connected to said source of voltage through motor energization circuit means and to define a discharge period wherein the motor winding is disconnected from said source of voltage and connected to a motor inductance discharging circuit means, said energizing and discharging circuit means having substantially equal impedance, and said discharging circuit means including means for clamping the voltage of said motor winding to a value substantially equal to the voltage applied to the winding by said source during said energization period, pulse width control means coupled to said switching means for controlling the duration of said energization periods, the relationship among (1) the energizing and discharging circuit time constants, (2) the duration of said energization period, (3) the repetition frequency of said energization periods, and (4) the L/R time constant of said motor being such that each of said discharge periods is substantially equal in duration to its associated energization period and that a counter EMF voltage is developed in said motor during a time period between the termination of said discharge period and the beginning of a subsequent energization period, the motor voltage developed during said time period being a function substantially of only motor speed, and averaging circuit means connected to said motor for providing a voltage indicative of counter EMF.

* * * * *